June 3, 1958  D. O. DRUGE  2,837,350
AIR SUPPLY LINE CHUCK
Filed May 14, 1956
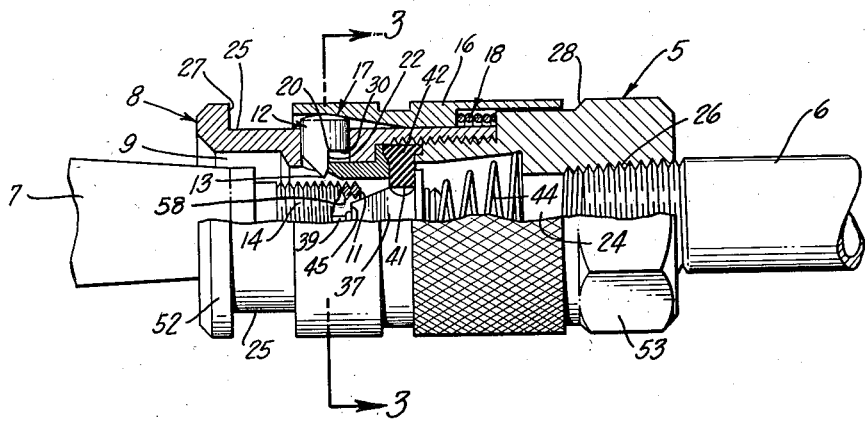
INVENTOR.
Dan O. Druge
BY Manfred M. Warren
His Attorney

United States Patent Office 2,837,350
Patented June 3, 1958

2,837,350

AIR SUPPLY LINE CHUCK

Dan O. Druge, San Leandro, Calif.

Application May 14, 1956, Serial No. 584,606

4 Claims. (Cl. 284—18)

The invention relates to connectors such as used in service stations, garages, and the like, and commonly referred to as chucks, for connecting an air supply line to a tire valve stem for inflating a tire, and more particularly to chucks constructed to grip and detachably lock onto the air valve stem during the air inflating operation.

An object of the present invention is to provide an air supply line chuck of the character described which may be readily, conveniently and rapidly applied to the tire valve stem with ease and precision, and which when applied will grip the valve stem with a constant predetermined and uniformly distributed pressure, thus insuring a proper attachment without danger of distorting or otherwise injuring or damaging the tire valve stem or the conventional threads thereon.

A still further object of the invention is to provide an air supply line chuck which is constructed of a minimum number of sturdily formed parts affording a lightweight, compact and trouble free assembly well adapted for use under rugged service conditions with a minimum of attention or repair.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

Referring to said drawing:

Figure 1 is a side elevational view on an enlarged scale of an air supply line chuck constructed in accordance with the present invention and shown approaching an operable position upon a tire valve stem, portions of the chuck being broken away and shown in cross section to illustrate interior construction.

Figure 2 is a longitudinal sectional view of the chuck and tire valve stem showing the parts in attached and locked position.

Figure 3 is a cross sectional view of the chuck and tire valve stem taken substantially on the plane of line 3—3 of Figure 1.

The air supply line chuck 5 of the present invention is adapted to provide an operating connection between an air supply line 6, such as the conventional air hose in service stations and garages, and a tire valve stem 7 to effect inflation of the tire. The chuck 5 includes a housing 8 formed with a socket 9 dimensioned to receive the open end portion 11 of the valve stem 7. Included in the housing 8 are a plurality of detents 12 carried in circumferentially spaced relation around the socket 9 for radial reciprocating movement to and from the periphery of stem end portion 11 when the latter is inserted in the socket. The detents 12 are formed with pointed inner ends 13 dimensioned to nest in the grooves of external threads 14 provided on the end portion 11 of the stem 7. Carried by the chuck 5 is a manually engageable member 16 which is movable between locking and unlocking positions. Cam means 17 is provided by the member 16 and detents 12 and is adapted for displacing the detents inwardly to a nested position, with their inner ends 13 engaged in the stem external threads 14 when member 16 is moved to locking position. Also carried by the chuck 5 is a spring means 18 biased to urge the manually engageable member 16 to its locking position so as to exert, through cam means 17, a constant inward pressure on the detents 12 and thus securely grip the tire valve stem 7.

The detents 12 are formed and arranged to exert an equalized cooperative gripping pressure on the tire valve stem 7 in a manner effective to hold the latter firmly in coaxial alignment in the socket 9 without danger of distorting or cutting the valve stem due to unequal pressure of detent ends 13 thereagainst. To accomplish equalized distribution of pressure on the stem 7, three or more detents 12 are arranged in substantially equally spaced circumferential relation to the socket 9 for radial reciprocation with respect to the axis of the socket. As here shown, three detents 12a, 12b, and 12c, of cylindrical form, are slidably mounted in radially extending cylindrical openings 19 which pass through the wall 21 of socket 9 at 120° spacings around the circumference of the socket. Preferably, the pointed inner ends 13 of the detents are formed to provide a V-shaped chisel edge of the same taper as the external threads 14 on valve stem 7 so that the detent inner ends will nest in the thread grooves when moved inwardly to the valve stem. In order to hold the V-shaped edges 13 in alignment with the threads 14, that is perpendicular to the axis of the valve stem and socket, the detents 12 are formed with a cut out portion 20 providing a flat side 22 parallel to the axis of the detent and adapted for sliding non-rotatable engagement with a guide member 23. In this manner, the detents 12 will be held against rotation in their bores 19, to maintain alignment of V-shaped edges 13 with valve stem threads 14, while still permitting axial reciprocation of the detents.

In the interests of compactness and simplicity, the chuck housing 8 is preferably of generally tubular form having an axial passage 24 communicating with socket 9 and an air supply line 6, which may be attached to the chuck as by threaded connection 26. The manually engageable member 16 is provided by an external sleeve slidably mounted for axial movement on an outside peripheral portion 25 of the chuck 5 between terminal positions, here adjacent to a pair of longitudinally spaced shoulders 27 and 28, and corresponding to locking and releasing condition of the chuck 5 on the tire valve stem 7.

The cam means 17 is provided by forming the sleeve 16 with internal cam portions or ramps 31 inclined with respect to the axis of the chuck and engageable with the outer ends 32 of detents 12 for displacing the latter inwardly to their nested position in valve stem threads upon movement of the sleeve to locking position adjacent to shoulder 27 as shown in Figure 2. For ease of manufacture the ramps 31 may consist of segments of a continuous conical surface. Movement of the sleeve 16 in the reverse direction to releasing position adjacent to shoulder 28, will move the cam ramps 31 away from the detents 12 permitting the latter to move outwardly from nested position, as shown in Figure 1.

In accordance with the present invention, the spring means 18 maintains the detents 12 in their nested engagement in steam threads 14 with a constant and uniformly distributed pressure sufficient to firmly lock the chuck 5 to the tire valve stem 7, but not enough to distort or damage the valve stem. Preferably, the spring means 18 consists of a coil spring 33 mounted around the chuck 5 interiorly of the sleeve 16 and compressed between an interior shoulder 34 on the sleeve and an exterior shoulder 36 on the chuck. In applying the chuck to a tire valve, the sleeve 16 is manually pulled, to the right as shown in Figure 1, to permit outward movement of the detents 12 by the relative advancing movement of the tire valve stem into the socket 9. The sleeve 16 is then released and, under the urging of spring 33, moves to the position of Figure 2 urging the detents 12 to nested gripping engagement in the threads of the tire valve stem 7. When the chuck is in detached position, spring 18 will urge sleeve 16 to the left, as seen in the drawing, to an abutted position against shoulder 27. In such position, the detents are retained internally by the engagement of the guide member 23 with a shoulder 30 provided by cut out portion 20.

As will be understood, the conventional tire valve stem 7 is provided with an internally arranged valve 38 having an axially displaceable valve opening stem 39 engageable at the open end 11 of the valve stem. In order to open this valve in the attached position of the chuck, the latter is provided with an internally arranged axially extending member 37 dimensioned for insertion into the stem end 11 for engagement with and displacing of the valve stem 39. Preferably, and as here shown, the member 37 is combined with a valve member 43 mounted in the chuck housing for controlling the flow of air from the supply line 6, the valve member 43 having a normally closed position for sealing off the air passage in the chuck when in detached position, and having the dual purpose of opening the tire valve 38 and itself being opened in the attached position of the chuck.

As here shown the valve member is coaxially mounted in passage 24 for movement to and from a washer 42, preferably of rubber or the like to provide a resilient annular valve seat, it being noted that the valve 43 moves to a seated position with the downstream flow of air so that the valve is pressure seated. Valve 43 is normally biased to closed position on the seat 42 by a spring 44 compressed between the valve member and an internal shoulder 46 in the central bore 24 of the chuck. The tire valve opening member 37 is preferably provided by a flattened integral forwardly tapered portion of the valve 43 which is dimensioned to project through and be guided by the central opening 41 of the valve seat washer 42 while still leaving room for the passage of air through seat 42. The member 37 is proportioned to extend into the open end of the valve stem and has a forward face 45 which serves as a seat for the end face of the tire valve opening stem 39 in the attached position of the chuck. The opposite tapered side edges 49 of member 37 are arranged to engage the internal periphery of stem end 11 when the forward face 45 has entered far enough to engage the valve opening stem 39 and displace the tire valve 38 to open position. Further movement of the stem end 11 into the socket 9 will then displace the valve member 43 to open position, against the action of spring 44, until the stem end 11 engages the resilient washer 42. Thus, valve 43 is normally closed in the detached position of the chuck and is automatically opened upon insertion of the stem end 11 into engagement with the washer 42. As will be noted, the washer 42 has an internal diameter somewhat smaller than the outside diameter of the tire valve stem end 11 so as to provide a stop therefor which will at the same time seal the chuck to the tire valve stem end 11 to prevent loss of air.

For simplicity in manufacture and ease in assembling, the chuck housing 8 preferably includes a pair of threadably attached tubular sections 52 and 53 having medially positioned confronting shoulders 54 and 56. Mounted between these shoulders are the valve seat washer 42 and a flange 57 formed on an end of a tubular part providing the guide member 23. The external threads 14 of the conventional tire valve stem normally extend further back from the stem end 11 than do the usual internal threads 58 used to support the tire valve 38. Advantage is taken of this construction to lessen any chance of distorting or cutting the tire valve stem by engaging the detents 12 with the stem at positions of maximum cross section, that is internally from the inner end of threads 58. This is accomplished in the present invention by spacing the valve seat washer 42 axially from the detents 12 by a distance sufficient to insure engagement of the external threads at the desired location when the stem end 11 is inserted into the socket 9 and into engagement with annular washer 42.

I claim:

1. An air supply line chuck for a tubular tire valve stem having an open end formed with threaded internal and external peripheries and an internal axially displaceable valve comprising, a housing formed with a socket dimensioned to coaxially receive said stem end, a valve member mounted in said housing for axial displacement from a closed position and having an axially extending tapered portion engageable with said inner periphery of said stem end, said tapered portion being dimensioned for insertion into said stem end for conjoint centering and coaxial displacement of said valve and valve member upon insertion of said stem end into said socket, a plurality of detents mounted in said housing in circumferentially spaced relation around the axis of said tapered portion for radial reciprocation and having pointed inner ends formed to nest in the thread grooves of said stem, a manually engageable member carried by said housing for movement between locking and unlocking positions, spring means biasing said last named member to locking position, and cam means provided by said last named member and said detents and formed for displacing said detents inwardly into said nested position for conjoint and concentric engagement of said inner and outer peripheries of said stem by said valve member and said detents upon movement of said manually engageable member to locking position, said cam means being formed for releasing said detents for outward movement out of engagement in said thread grooves upon movement of said manually engageable member into unlocking position.

2. An air supply line chuck for an externally threaded open end tire valve stem having an internal axially displaceable valve comprising, a housing formed with a socket dimensioned to coaxially receive said stem end and having an axially extending member dimensioned for insertion into said stem end for displacing said valve, said housing being formed with a plurality of circumferentially spaced radially extending openings, detents mounted for radial reciprocation in said openings and having pointed inner ends formed to nest in the thread grooves of said stem, a manually engageable sleeve surrounding and carried by said housing for longitudinal movement between terminal locking and unlocking positions, and spring means biasing said sleeve to locking position, said sleeve having internally formed inclined cam portions engageable with the outer ends of said detents for displacing said detents inwardly into said nested position upon movement of said sleeve to locking position and for releasing said detents for outward movement out of engagement in said thread grooves upon movement of said sleeve into unlocking position.

3. An air supply line chuck for an externally threaded open end tire valve stem having an internal axially displaceable valve comprising, a housing formed of first and second threadably attached tubular sections having medially positioned confronting shoulders, a tubular guide member mounted in said first section and having an external flange supported on one of said shoulders and being dimensioned to coaxially receive said stem end, a valve washer mounted and sealed between said flange and the other of said shoulders concentrically with said guide member, a valve member mounted in said second section for axial reciprocation to and from said washer and having a forwardly tapered end dimensioned for insertion into said stem end for displacing said valve, said housing being formed with a plurality of circumferentially spaced radially extending openings, detents mounted for radial reciprocation in said openings and having V shaped inner ends formed to nest in the thread grooves of said stem and being formed with a flat side positioned in sliding non-rotatable engagement with said guide member, a manually engageable sleeve surrounding and carried by said housing for longitudinal movement between terminal locking and unlocking positions, and spring means biasing said sleeve to locking position, said sleeve having internally formed inclined cam portions engageable with the outer ends of said detents for displacing said detents inwardly into said nested position upon movement of said sleeve to locking position and for releasing said detents for outward movement out of engagement in said thread grooves upon movement of said sleeve into unlocking position.

4. An air supply line chuck for an externally threaded open end tire valve stem having an internally axially displaceable valve comprising, a housing formed of first and second threadably attached tubular sections having medially positioned confronting shoulders, a tubular guide member mounted in said first section and having an external flange supported between said shoulders and being dimensioned to coaxially receive said stem end, said housing being formed with a plurality of circumferentially spaced radially extending cylindrical openings, generally cylindrical detents mounted for radial reciprocation in said openings and having V shaped inner ends formed to nest in the thread grooves of said stem and being formed with a cut out portion providing a flat side positioned in sliding non-rotatable engagement with said guide member and providing a shoulder engageable with said guide member to retain said detents in said openings, a manually engageable sleeve surrounding and carried by said housing for longitudinal movement between terminal locking and unlocking positions, and spring means biasing said sleeve to locking position, said sleeve having internally formed inclined cam portions engageable with the outer ends of said detents for displacing said detents inwardly into said nested position upon movement of said sleeve to locking position and for releasing said detents for outward movement out of engagement in said thread grooves upon movement of said sleeve into unlocking position.

References Cited in the file of this patent
UNITED STATES PATENTS

| | | |
|---|---|---|
| 707,991 | Wareham | Aug. 26, 1902 |
| 1,383,306 | Jacques | July 5, 1921 |
| 1,797,383 | Wahl et al. | Mar. 24, 1931 |
| 2,434,167 | Knoblauch | Jan. 6, 1948 |